July 23, 1963 W. H. DOERFNER Re. 25,426

BALL NUT SCREW ASSEMBLY

Original Filed Aug. 18, 1955

INVENTOR.
William H. Doerfner
BY
Paul Fitzpatrick
ATTORNEY

United States Patent Office

Re. 25,426

Reissued July 23, 1963

25,426

BALL NUT SCREW ASSEMBLY

William H. Doerfner, Saginaw, Mich., assignor to General Motors Corporation, Detroit, Mich., a corporation of Delaware Original No. 2,779,206, dated Jan. 29, 1957, Ser. No. 529,150, Aug. 18, 1955. Application for reissue Feb. 10, 1958, Ser. No. 715,166

12 Claims. (Cl. 74—459)

Figure 1:
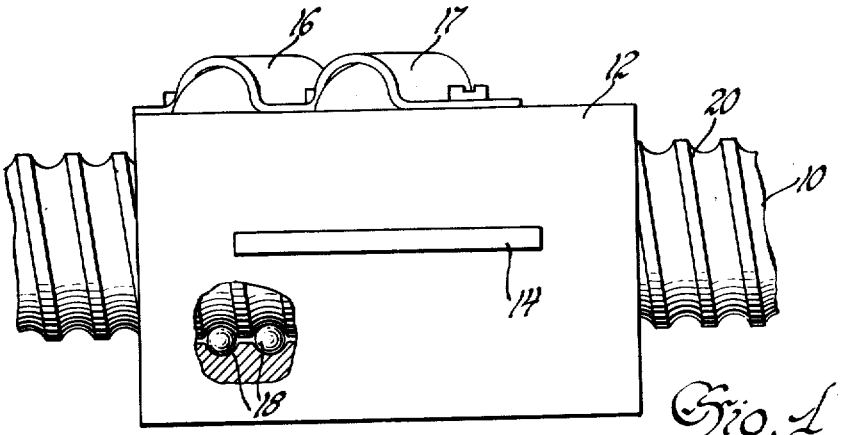

Matter enclosed in heavy brackets [ ] appears in the original patent but forms no part of this reissue specification; matter printed in italics indicates the additions made by reissue.

My invention relates to worm and nut devices of the type wherein the connection between the worm and nut is a train of balls confined within a passageway formed by the helical grooves in the worm and nut.

Devices of this type find application, for example, in machine tools and in various types of actuators, including aircraft actuators. Also such a device may be used, with advantage, in steering mechanisms, both mechanical and powered—see, for instance, Hawkins Patent 2,267,524 and co-pending application Serial No. 431,422 filed May 21, 1954, *now Patent No. 2,897,684,* in the names of Clovis W. Lincoln, Henry S. Smith and Philip B. Zeigler.

While the present invention is generally applicable to ball bearing screw and nut devices, it represents an outgrowth of difficulties experienced during the development of the power steering gear disclosed in the identified application. This gear is distinguished inter alia in that the power piston is housed within the gear box and in that the piston carries rack teeth mating with the gear sector integral with the cross shaft and connecting through the shaft with the pitman arm. The piston is bored and counterbored to accommodate the worm end of the steering shaft and the ball nut, the latter being positioned in the counterbore in fixed relation to the piston and surrounding the worm.

It was found on an initial test of the described gear that the reversibility thereof was unsatisfactory due largely to the faulty lash characteristics of the worm and nut assembly. These faulty lash characteristics derived from the fact that it is virtually impossible with present day grinding equipment to provide a helical groove in a piece of stock, which does not taper to some extent [from] *at random between* one end of the piece [to] *and* the other. This problem had not been of particular importance as to prior gears, where the lash between the worm and nut could readily be set for any relative position of these parts, despite an imperfect worm groove, through controls applied in the generation of the gear sector teeth and the mating rack teeth (carried by the nut in these prior constructions) and through axial adjustment of the gear sector relative to the nut after assembly. In the power steering gear of Lincoln et al. the nut, as brought out above, does not mate directly with the gear sector and it, therefore, was not possible to handle the lash problem in the manner just indicated.

It should be here injected that for good reversibility in a ball nut type steering gear, it is highly desirable, if not essential, that there be no lash between the worm and nut when the same are in centered relation and that the play or lash between the parts off-center progressively increase in either direction. With the lash so adjusted, there is little, if any, likelihood of overshooting beyond center on the reversal, this because of the braking action afforded by the no-lash condition over center.

In accordance with the present invention I achieve the desideratum just described by gradually varying the pitch diameter of the thread of one or both of the worm and nut outward of center. Most preferably, and largely as a matter of convenience, I gradually vary the pitch diameter of the worm thread rather than the internal thread of the nut. *Such an assembly is characterized in operation in that as the balls constituting the connection between the worm and nut travel toward the mid-point of the worm from a selected point outward of the mid-point the radial distance of the balls from the axis of the worm progressively increases.*

On reflection, it will be recognized that in effect, instead of seeking to avoid the formation of a taper groove in the grinding operation yielding the worm, as has been the practice heretofore, I deliberately introduce taper, and yet I solve the problem which has been occasioned by the tapering.

Figure 2:
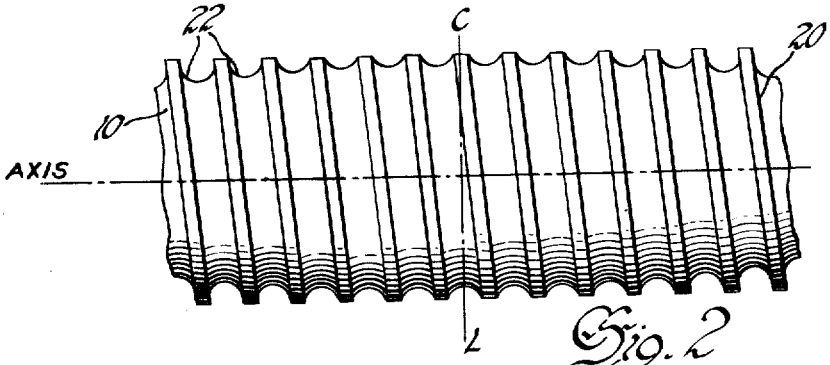
Figure 3:
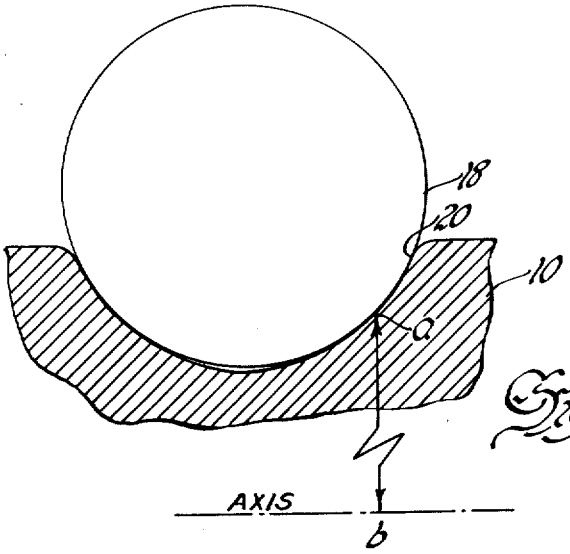

My invention will be better understood by reference to the accompanying drawings and the detailed description which follows. In the drawings, FIGURE 1 shows a typical ball nut and screw assembly;

FIGURE 2 is a detail of the worm or screw component, the effect of my invention on the shape thereof being exaggerated; and FIGURE 3 is an enlarged view showing one of the connecting balls seated in the helical worm groove.

In FIGURE 1, the worm and nut are denoted by the numerals 10 and 12, respectively. The nut carries a key 14 whereby it may be connected to a part (not shown) to be actuated. Otherwise, the nut is adequately described in the previously mentioned Hawkins Patent 2,267,524, and in view of such patent a detailed description here is considered unnecessary. Suffice it to say that the nut has a helical internal groove complementary to the worm groove and that it encases two separate ball trains as reflected by the two return tubes 16 and 17.

A worm or screw ground or otherwise formed according to the instant invention has a slightly barrel shaped pitch line configuration, an effect which, as before indicated, is exaggerated in FIGURE 2 in the interest of simplifying an understanding of the invention. Actually, a worm of such size would not appear so shaped to the naked eye.

The barrel shape results from the progressive decrease in the pitch diameter toward each end as compared with that at the center C—L of the worm. Pitch diameter may be defined as twice the distance between the axis of the worm and the mean point of contact of the ball 18 (FIG. 3) and the side wall of thread 20, i.e. twice the distance a—b.

In forming the particular worm here in contemplation, I avoid any variance in the pitch diameter over 300°—360° of lead to each side of the center line. This gives the desired no-lash condition of the worm and nut when the same are in their centered position. Also, in the case of the particular worm, I find it advantageous to obtain the gradual pitch diameter reduction by progressively increasing the depth of the over-all profile of the worm groove 22 relative to the external diameter of the worm at a rate of the order of .003/.004 inch per linear inch of worm.

Having thus described and illustrated my invention what I claim is:

1. In a worm and nut device wherein the connection between the worm and nut comprises a ball train confined in a passageway formed by the worm groove and a complementary internal helical groove in the nut, the improvement which resides in gradually varying the pitch diameter of the thread of one or both of said worm and said nut outward of center so as to obtain a condition of no-lash on center and progressively increasing lash off-center.

2. In a worm and nut device wherein the connection between the worm and nut comprises a ball train confined in a passageway formed by the worm groove and a complementary internal helical groove in the nut, the improvement which resides in gradually varying the pitch diameter of the thread of one of said worm and said nut in either direction away from center so as to obtain a condition of no-lash on center and progressively increasing lash off-center.

3. In a worm and nut device wherein the connection between the worm and nut comprises a ball train confined in a passageway formed by the worm groove and a complementary internal helical groove in the nut, the improvement which resides in gradually varying the pitch diameter of the thread of the worm outward of center in both directions so that in application of the device there is no lash between the worm and nut when the same are in centered relation and so that on relative movement of the worm and nut off center in either direction a condition of progressively increasing lash obtains.

4. A device according to claim 3 in which the depth of the worm groove progressively increases in either direction off-center at a rate of the order of .003/.004 inch per linear inch.

5. A device according to claim 3 wherein the no-lash condition obtains to the extent of from about 300° to 360° of lead both sides of center.

*6. In a steering mechanism, a steering spindle provided with a threaded portion, a nut member completely surrounding said threaded portion and provided with helical grooves complementary to the helical grooves of said threaded portion and means including a chain of balls engaging the channels formed by said complementary grooves for transmitting the steering motion from said steering spindle to said nut, the threaded portion of said steering spindle being provided with an essentially constant external diameter and with a root diameter increasing from both ends toward the center thereof.*

*7. In a worm and nut device wherein the connection between the worm part and nut part comprises a ball train confined in a passageway formed by the worm groove and a complementary internal helical groove in the nut, said ball train transmitting a load between the worm and nut part, the improvement which resides in gradually varying the pitch diameter of the thread of at least one of said parts so that on relative motion therebetween while the ball train transmits a load between the two parts, the lash condition between the two parts gradually changes.*

*8. In combination, a screw part, a nut part, complementary helical groove means on said screw part and said nut part defining a ball passageway, a train of balls in*

*said ball passageway providing a driving connection between said screw part and said nut part and being rolled therealong upon relative rotation between said screw part and said nut part, and at least one of said helical groove means having a gradually varying groove diameter in the region where the balls engage the helical groove means during rotation, said groove diameter being measured transversely to the axis of said screw part and gradually increasing in magnitude along a substantial operational longitudinal length of the part having said one helical groove means so that on relative rotation between said screw part and said nut part in one direction, the radial distance of the balls from the axes of said parts gradually increases to gradually reduce the lash condition between said parts to a predetermined minimum lash condition at a preselected operational point during relative movement of said parts.*

*9. The invention defined in claim 8 and said one helical groove means being the helical groove means on said screw part.*

*10. In combination, a screw part, a nut part, said screw part and said nut part having complementary helical groove means defining a ball passageway, a train of balls in said ball passageway providing a driving connection between said screw part and said nut part upon relative rotation between said parts, and at least one of said helical groove means having lash changing means for gradually varying the radial distance of the balls from the axes of said parts along a substantial length of the part having said one helical groove means when there is relative rotation between said parts so that on relative rotation between said parts the lash condition between said parts gradually changes during operation of said train of balls in said continuously loaded condition.*

*11. The invention defined in claim 10 and said lash changing means being provided by gradually varying the pitch diameter of the helical groove means of said screw part.*

*12. The invention defined in claim 10 and said lash changing means being provided by gradually varying the pitch diameter of the helical groove means of said screw part from a minimum lash point in both directions to gradually increase the lash.*

References Cited in the file of this patent or the original patent

UNITED STATES PATENTS 2,508,261 Hosler ---------- May 16, 1950